United States Patent Office 3,403,976
Patented Oct. 1, 1968

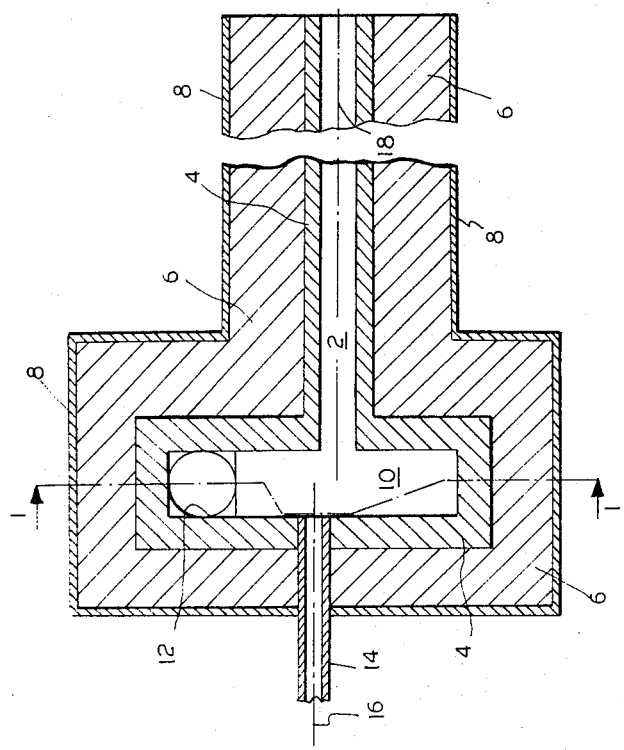
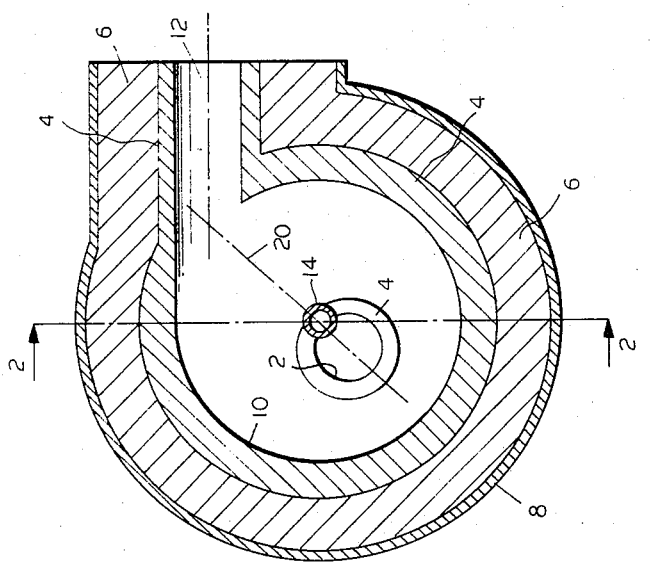

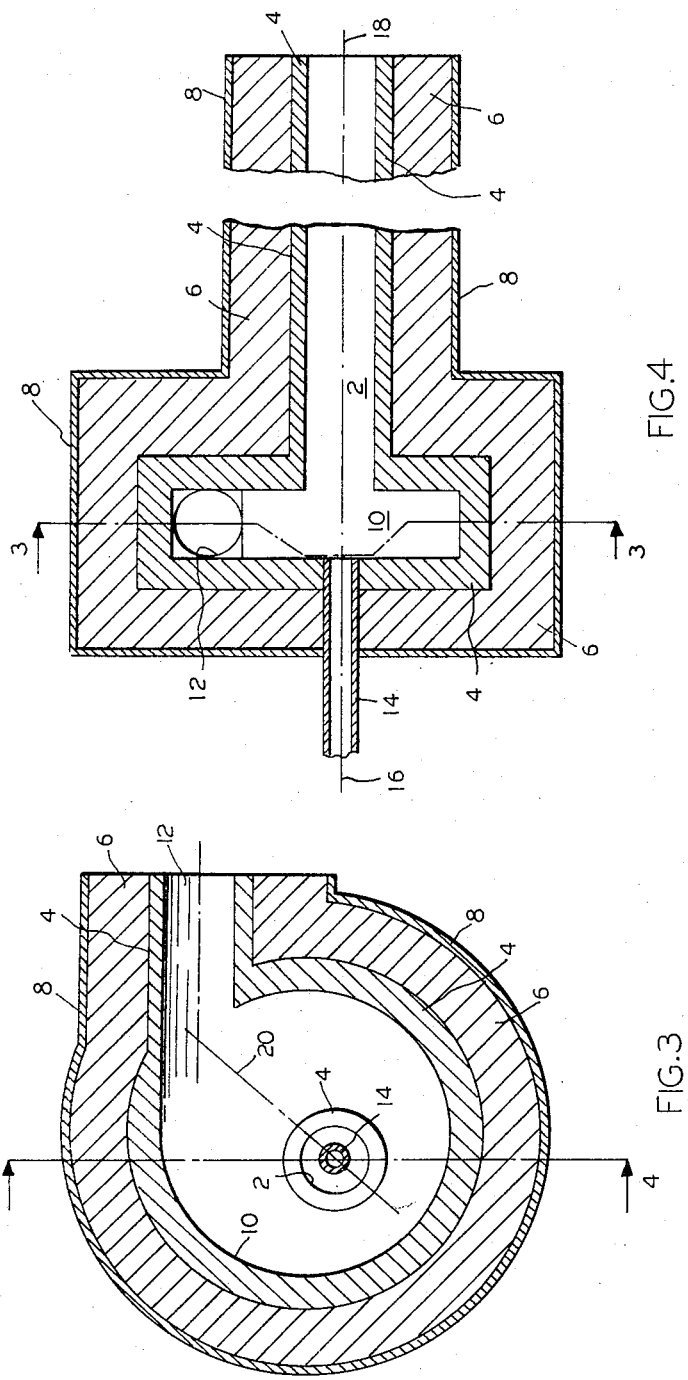

3,403,976
TANGENTIAL ENTRY PRECOMBUSTION-TYPE
REACTOR WITH OFFSET TUNNEL
Ivan Ceresna, Houston, Tex., and John H. Sullivan,
Greenville, S.C., assignors to Ashland Oil & Refining Company, Houston, Tex., a corporation of Kentucky
Filed Feb. 10, 1966, Ser. No. 526,547
10 Claims. (Cl. 23—209.4)

ABSTRACT OF THE DISCLOSURE

A tangential entry precombustion-type reactor in which the axis of the second, or reaction, chamber is offset from the axis of the first, or combustion, chamber, and in which one tangential inlet is employed for introducing the flaming fuel instead of the usual two.

---

This invention relates to carbon black. More particularly, it relates to the preparation of carbon black in accordance with the furnace process. Still more particularly, it relates to a method and apparatus for producing carbon black by the thermal decomposition of a hydrocarbon.

In general, the furnace process comprises decomposing a hydrocarbon by heat generated from the burning of a portion of the hydrocarbon and/or by the substantially complete combustion of a second, and generally different, hydrocarbon in a confined zone or zones within a reactor lined with refractory or other material resistance to heat and attrition. The hydrocarbon feedstock employed, the method of injecting the reactants into the reactor, reaction temperature, reaction time, peripheral velocity and turbulence of the reaction mass in the reaction chamber, ratio of refractory surface to reaction chamber volume, among other things, are all variables which determine the grade of the carbon black, as well as the quality of any particular grade. Since the reaction itself has, to a great extent, limited possibilities of improvement, a great deal of the recent research, which has led to modifications and improvements, has dealt with the reaction equipment and its utilization.

One type of equipment which has been developed for the production of improved carbon black by the furnace process, is what is known as a "tunnel" type or "tube" type reactor. In this reactor system two cylindrical sections, one short section of large diameter, referred to hereafter as the "combustion section," and, an elongated section of considerably smaller diameter, referred to hereafter as the "reaction section." In the use of this reactor system, a hydrocarbon, comprising a liquid or gaseous material, and generally referred to as the "hydrocarbon feedstock," is passed into the combustion section and thence into the reaction section of the furnace.

The prior patent art is replete with examples of such reactors. Reference may be made to such patents for further details. One example of a tunnel or tube-type reactor which has been described in the prior art includes means for tangential introduction of an inflammable or flaming mixture into the combustion section. Such a reactor is referred to as a tangential entry precombustion-type reactor.

While such reactor has proved effective in the preparation of furnace blacks, nevertheless it is subject to certain limitations. For example, the flow of combustible mixture and its products of combustion should preferably be at its optimum velocity and spiralling configuration when it enters the reaction section and when it makes its initial contact with the reactant hydrocarbon. To accomplish this, the above-described reactor utilizes two combustible mixture inlets tangentially introducing the combustible mixture at diametrically opposed positions about the combustion section. In other words, whether the two combustible mixture tubes are used, as is the universal case, or more tubes are used, as sometimes suggested, a balanced introduction of combustible mixture is sought. It has thus been considered an absolute necessity that at least two ducts, for the introduction of combustible mixture, be employed to assure that the vortex of swirling combustion gases will be axially centered in the combustion section and coincident with the axis of the reaction section as they pass through the reaction section. In order to accomplish this it is also necessary that the rate of injection of the combustible mixture be accurately adjusted in both inlets. If these requirements of a balanced injection with two or more ducts and an accurate adjustment of the rate of combustible mixture introduced by each duct are not adhered to, the vortex of the swirling mixture of combustion gases will be off-center in both the combustion chamber and the reaction chamber and such off-center introduction of materials causes serious problems. If such off-center introduction occurs, uneven wear and burnout of the refractory linings of the combustion section and the reaction section of the furnace occur, and frequent replacement of these linings is necessitated, particularly at the point where the two sections are joined. In any event, irrespective of which part of the linings is burned out and irrespective of whether such burnout is premature or normal, the replacement of these linings and other interior parts of the reactor is a costly operation since it takes several days to heat up and shut down the reactor system in order to prevent thermal shock and more serious damage. In addition to the problem of burnout such systems are also quite unstable and subject to considerable noise and vibration during use. This, of course, is also destructive to the furnace and its appurtenant equipment. Further, the operation of such combustible mixture introducing systems is often quite erratic even under ideal conditions. This erratic operation results in many cases in a whipping action on both the tubes utilized for introducing fuel gas and the stream of feedstock and on the swirling stream of combustible mixture and combustion gases. This, of course, is just another form of instability caused by vibration and the tendency of the stream of charge materials to get off-center if the rate of introduction of the combustible mixture is not strictly controlled. Thus, combustible mixture introduction systems of this type are quite inflexible and do not permit reasonable variation. The instability and erratic operations of these systems also result in unburned hydrocarbon feedstock and considerable coke formation in the reaction zone. The presence of this coke and unburned hydrocarbons not only degrades the carbon product but also necessitates frequent shutdowns simply for purposes of cleaning up the interior of the reactor. Accordingly, it would be a great aid if means for introducing combustible mixtures could be provided which do not require the delicate control heretofore necessitated and which could eliminate the unstable and erratic operation of prior art systems, while also permitting a wider latitude of operational variations.

It is therefore a principal object of the present invention to provide such an improved process and apparatus. Another object of the present invention is to provide a process and apparatus in which the flow of combustible mixture and its products of combustion is so controlled and directed as to provide optimum flow and velocity through the reactor. Still another object of the present invention is to provide an improved process and apparatus wherein mixing of combustion products and feedstock is maintained at an optimum and effective level. Yet another object of the present invention is to provide an improved process and apparatus capable of utilizing a single tangential stream of combustible mixture. Another and further object of the present invention is to provide an improved process and apparatus in which an off-center vortex of combustible mixture and combustion products in a combustion section is directed efficiently through a tunnel-type reaction section. A further object of the present invention is to provide an improved process in which the axis of introduction of feedstock into a combustion chamber and the axis of discharge of combustion products and feedstock from the reaction chamber are offset from one another. Another object of the present invention is to provide an improved process in which the axis of discharge of feedstock and combustion products from a combustion chamber is offset from the central axis of the chamber in a direction away from a single tangentially-introduced stream of combustible mixture. A still further object of the present invention is to provide an improved process in which the axis of introduction of feedstock into a combustion chamber and the axis of discharge of feedstock and combustion products from the combustion chamber are coaxial and are offset from the central axis of the chamber in a direction away from a single tangentially introduced stream of combustible mixture.

These objects have been met and the advantages set forth have been attained in a relatively simple and surprising manner which is directly contrary to the teachings of the prior art. In general, while the prior art specifically provides that the tangential injection of combustible mixture into a cylindrical combustion chamber must be by means of at least two diametrically opposed feed ducts, it has been found in accordance with the present invention that a single tangential injection of combustion mixture can be utilized without the many disadvantages heretofore anticipated. Specifically, in accordance with the present invention, a single stream of combustible mixture is tangentially injected into a cylindrical combustion section while effluent materials are discharged perpendicularly from the combustion section along an axis offset from the central axis of the combustion section in a direction away from the combustible mixture inlet. Accordingly, this technique can be practiced by utilizing a combustion chamber having a single combustible mixture inlet adapted to tangentially introduce such mixture, an axially-disposed hydrocarbon feedstock inlet and a tunnel-type reaction chamber discharge duct offset from the axis of the combustion chamber by a distance and at an angle such that the off-center vortex of charge materials to the combustion chamber are discharged from the combustion chamber through the center of the tunnel-type reaction zone.

The above objects and advantages will be apparent from the following detailed description when read in conjunction with the accompanying drawings, wherein:

FIGURE 1 is a sectional end view of a reactor in accordance with this invention, taken along the line 1—1 of FIGURE 2;

FIGURE 2 is a sectional side elevation taken along the line 2—2 of FIGURE 1;

FIGURE 3 is a sectional end view of a preferred reactor in accordance with this invention, taken along the line 3—3 of FIGURE 4; and FIGURE 4 is a sectional side elevation taken along the line 4—4 of FIGURE 3.

It is to be understood, however, that the variations shown in the drawings are intended to be by way of illustration only and not by way of limitation. It is also to be recognized that common numerals have been used for corresponding parts of both modifications of the invention in order to simplify and facilitate the following description but such parts need not necessarily be exact duplicates in actual practice.

Referring now to FIGURES 1 and 2 of the drawings, there is illustrated therein a reactor in which the numeral 2 denotes an elongated reaction section or chamber, of a generally tubular configuration, surrounded by a high temperature refractory liner 4. Surrounding liner 4 is a castable refractory insulation 6 which, in turn, is enclosed with an outer steel shell or casing 8. The refractory materials are well known materials of construction in the art, which are resistant to the high temperatures normally encountered in this service. Both ends of reaction section 2 are open, one of which communicates with a carbon black recovery system of conventional design, which forms no part of this invention. The other or opposite end of reaction section 2 communicates with a combustion section or chamber 10 which is of a considerably larger diameter but of substantially shorter length than reaction section 2. Combustion section 10 is similarly enclosed by the aforesaid refractory liners in order to withstand the high temperatures generated within the reactor. Situated tangentially to the inner-surface of combustion zone 10 is a single inlet duct 12 for introducing a combustible mixture, either as a mixture or as its individual components. Alternatively, duct 12 may be utilized to introduce a combustion-supporting gas alone, where a fuel is introduced along with the hydrocarbon feedstock and this fuel and/or the hydrocarbon feedstock is utilized to generate the combustion gases for heating purposes. Mounted in the end and either centrally located or offset from the central axis of combustion chamber 10 is hydrocarbon feedstock conduit 14. Additional means, not shown, are generally associated with conduit 14 for introducing a combustion-supporting gas and/or fuel gas.

As previously indicated, by providing only one combustible mixture duct 12 the swirling combustible mixture and feedstock and ultimately the swirling vortex of combustion gases or flue gases, generated by reaction of the combustible mixture, and feedstock will be off-center with respect to the reaction chamber 2. In other words, the vortex of combustion gases in combustion chamber 10 as they leave combustion chamber 10 to enter reaction chamber 2 is offset from the center of combustion chamber 10 in a direction away from the center of duct 12. In other words, the single duct 12 causes the vortex to shift away from the duct 12. As previously pointed out, such an off-center location of the vortex of a swirling combustible mixture normally causes serious difficulties in the conduct of the carbon black reaction as well as severe damage to the reactor. It has been found, however, in accordance with the present invention, that these difficulties can be eliminated and a single entry duct 12 can be conveniently utilized if axis 18 of reaction chamber 2 is offset from the central axis of chamber 10 by the same approximate distance as the central axis of combustion section 10 is offset from the vortex of the combustion gases in chamber 10. Accordingly, as shown in FIGURE 1, feedstock conduit 14 is centered with respect to the center line of combustion chamber 10 and reaction chamber 2 is offset from the axis of conduit 14 and the central axis of combustion chamber 10. The distance that axes 16 and 18 are to be offset, as well as the angle of the offset, can be conveniently determined for any given size and configuration of combustion chamber and combustible mixture conduit by simple experimentation. It is not possible to recite such distances and angles in absolute units since the sizes, etc., of the equipment will cause variation. However, as shown in FIGURES 1 and 2, if duct 12 introduces combustible mixture at a tangent point at the top or at zero degrees, a line joining the center line of duct 12 with the center line of combustion section 10, as line 20 of FIGURES 1 and 2, will define the locations of the axes of conduit 14 and the reaction section 2. In a specific situation shown, this line is at an angle of roughly 45°. However, it is obvious that with a larger combustible mixture duct 12, the angle would be greater.

As shown in FIGURES 3 and 4 of the drawings the configuration of FIGURES 1 and 2 can be modified by changing the position of the axis 16 of the feedstock conduit 14 to make it coaxial with axis 18 of the reaction zone 2. While the location of conduit 14 coaxially with chamber 10, as shown in FIGURES 1 and 2, permits the major advantages of the present invention to be accomplished, it is preferred that the configuration of FIGURES 3 and 4, where the conduit 14 is coaxial with reaction zone 2, be utilized.

By the practice of either of the above-described modifications it has been found that the difficulties heretofore encountered in the balancing and control of the rate of combustible mixture injection into the combustion zone of a reactor of the type described can be substantially eliminated and the reactor can be made to operate over a wider range of injection rates. By the same token the problems heretofore encountered by the improper or unbalanced operation of the prior art equipment are avoided. By practicing the invention of the present application the heretofore expected wear and damage to the reactor is not experienced and the reactor is not subject to the erratic operation which has caused damage to such reactors and resulted in incomplete or reduced conversion of reactant materials and the consequent accumulation of heavy deposits in the reactor.

Having described and illustrated several embodiments of the present invention it is to be understood, however, that other modifications and variations will be apparent to one skilled in the art and that the claims of the present application are to be limited only in accordance with the appended claims.

We claim:

1. A reactor for producing carbon black by thermal decomposition of a hydrocarbon feedstock which comprises: a tubular combustion chamber having a diameter substantially greater than its length; a single injection means tangentially disposed with respect to the circumferential wall of said combustion chamber and in open communication therewith for tangentially injecting a stream of combustible mixture into said combustion chamber, and imparting to said stream of combustible mixture, including the combustion gases resulting from the combustion thereof, a rotational flow having a vortex adjacent the central axis of said combustion chamber but displaced from said axis in a direction away from said single injection means; a tubular reaction chamber of substantially smaller diameter and substantially greater length than said combustion chamber axially disposed parallel to said central axis of said combustion chamber and in open communication with one end of said combustion chamber; and a hydrocarbon feedstock conduit having its axis disposed parallel to said central axis of said combustion chamber and in open communication with the other end of said combustion chamber; the axis of said reaction chamber being offset from said central axis of said combustion chamber in a direction away from said injection means along a straight line passing through the central axis of said injection means at the interior end thereof and through said central axis of said combustion chamber perpendicular thereto, thereby causing the central axis of said vortex of said stream of combustible mixture and said combustion gases to coincide with the central axis of said reaction chamber.

2. A reactor in accordance with claim 1 wherein the axis of the feedstock conduit is coincident with the axis of the combustion chamber.

3. A reactor in accordance with claim 1 wherein the axis of the feedstock conduit is coincident with the axis of the reaction chamber.

4. A reactor for producing carbon black by thermal decomposition of a hydrocarbon feedstock which comprises: a tubular combustion chamber having a diameter substantially greater than its length; a single injection means tangentially disposed with respect to the circumferential wall of said combustion chamber and in open communication therewith for tangentially injecting a stream of combustible mixture into said combustion chamber; a tubular reaction chamber of substantially smaller diameter and substantially greater length than said combustion chamber axially disposed parallel to the central axis of said combustion chamber and in open communication with one end of said combustion chamber; and a hydrocarbon feedstock conduit axially disposed parallel to said central axis of said combustion chamber and in open communication with the other end of said combustion chamber, said reaction chamber and said feedstock conduit being offset from said central axis of said combustion chamber in a direction away from said injection means along a straight line passing through the central axis of said injection means at the interior end thereof and through said central axis of said combustion chamber perpendicular thereto.

5. A reactor for producing carbon black by thermal decomposition of a hydrocarbon feedstock which comprises: a tubular combustion chamber having a diameter substantially greater than its length; a single injection means tangentially disposed with respect to the circumferential wall of said combustion chamber and in open communication therewith for tangentially injecting a stream of combustible mixture into said combustion chamber; a tubular reaction chamber of subsantially smaller diameter and substantially greater length than said combustion chamber having its axis disposed parallel to the central axis of said combustion chamber and in open communication with one end of said combustion chamber; and a hydrocarbon feedstock conduit having its axis disposed adjacent said central axis of said combustion chamber and having an outlet directed generally toward the other end of said combustion chamber; the axis of said reaction chamber being offset from said central axis of said combustion chamber in a direction away from said injection means.

6. A reactor in accordance with claim 5 wherein the axis of the feedstock conduit is coincident with the axis of the combustion chamber.

7. A reactor in accordance with claim 6 wherein the axis of the feedstock conduit is coincident with the axis of the reaction chamber.

8. A reactor in accordance with claim 5 wherein the axis of the feedstock conduit is offset from the axis of the combustion chamber.

9. A method for producing carbon black by the thermal decomposition of a hydrocarbon feedstock which comprises: injecting a single stream of a combustion mixture tangentially along the circumferential wall of a tubular combustion chamber; thereby creating a rotational flow of said stream of combustible mixture, including combustion gases resulting from the combustion thereof, with a vortex adjacent the central axis of said combustion chamber and in a direction toward the opposite side of said central axis of said combustion chamber from the side at which said single stream of said combustible mixture is injected; injecting a stream of hydrocarbon feedstock into one end of said combustion chamber parallel to said central axis of said combustion chamber; burning at least a part of said combustible mixture in said combustion chamber; discharging an effluent stream containing combustion gases of said burning step and feedstock from the opposite end of said combustion chamber parallel to said central axis of said combustion chamber into a tunnel-type reaction chamber of substantially greater length than said combustion chamber, the axis of the discharged stream of said effluent being offset from said central axis of said combustion chamber and coincident with the axis of the reaction chamber; and thermally converting said feedstock to carbon in said effluent stream in said reaction chamber.

10. A method in accordance with claim 9 wherein the axis of the feedstock stream is coincident with the axis of the combustion chamber.

References Cited

UNITED STATES PATENTS

| 2,564,700 | 8/1951 | Krejci | 23—209.4 |
| 2,641,534 | 6/1953 | Krejci | 23—209.4 |
| 3,211,532 | 10/1965 | Henderson | 23—259.5 |

EDWARD J. MEROS, *Primary Examiner.*